United States Patent Office 3,708,379
Patented Jan. 2, 1973

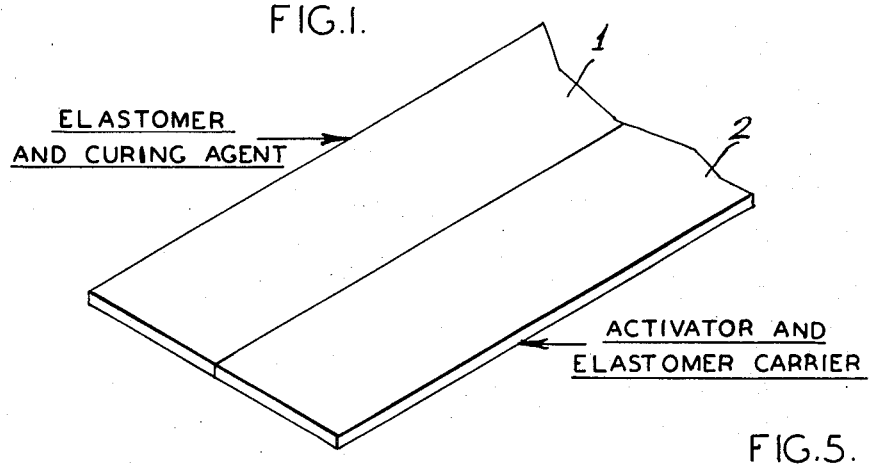
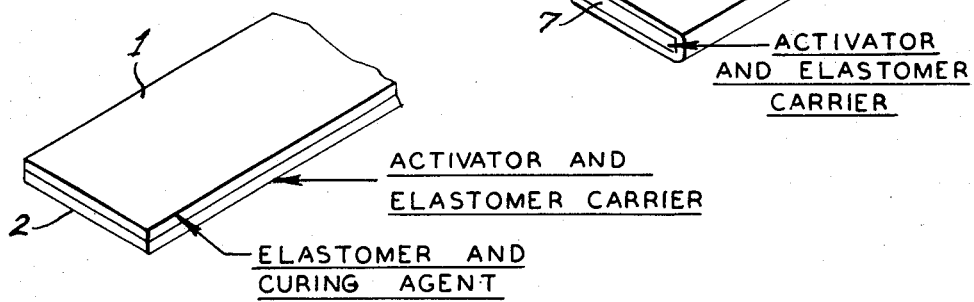
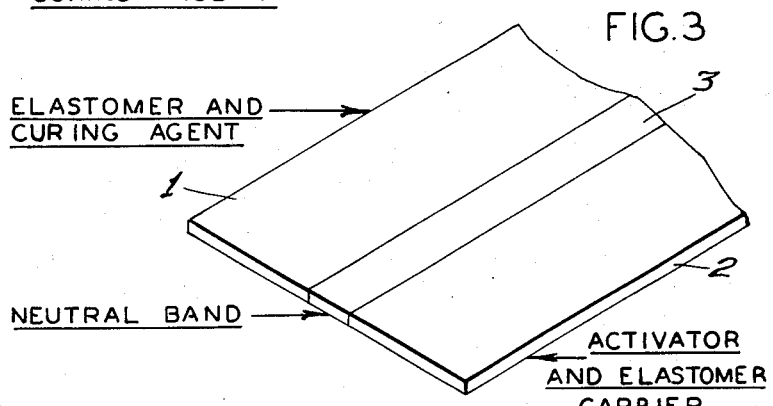
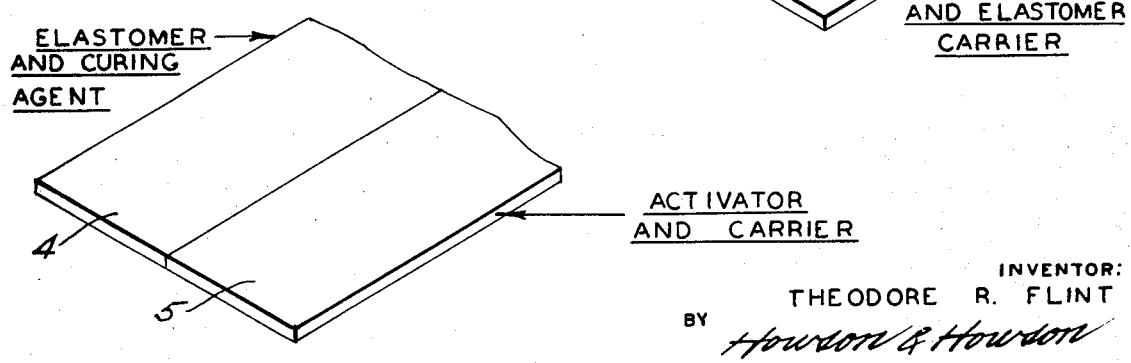

3,708,379
ELASTOMERIC TAPE
Theodore R. Flint, Jug Hollow Road,
Valley Forge, Pa. 19481
Filed May 10, 1971, Ser. No. 141,664
Int. Cl. B32b 3/10
U.S. Cl. 161—36                                    15 Claims

ABSTRACT OF THE DISCLOSURE

An elastomeric tape useful as an adhesive and/or a sealant comprised of a first band of uncured elastomer and a second band comprised of a curing agent for the elastomer of the first band dispersed in a carrier. Kneading together of substantially equal lengths of opposed portions of the first and second bands results in an elastomeric composition which is self-curing.

BACKGROUND OF THE INVENTION

Various elastomeric compositions useful as sealants and adhesives are available commercially. These compositions generally comprise uncured natural or synthetic rubber together with curing agents. Curing is effected by the addition of curing agents and accelerators to the elastomer.

Since the curing agent and accelerator cannot be combined with the elastomer prior to the time of use, otherwise premature curing would take place, it has been customary to supply the elastomer in a separate package from the curing agent and accelerator. In use, the contents of the two packages, or portions thereof, are combined to provide a self-curing composition. Such systems are undesirable from the standpoint of packaging costs. In addition, the customer is required to follow specific mixing instructions to obtain a satisfactory coating or sealant composition.

It is a principal object of this invention to provide a self-curing elastomeric composition in tape form. A further object of this invention is to provide a self-curing elastomeric composition useful as an adhesive and/or a sealant in tape form. Another object of this invention is to provide an elastomeric composition containing both an elastomer and a curing system therefor which requires no special packaging or storage conditions, yet remains in a stable, uncured state for an indefinite period of time and is readily curable by simple mixing by either hand or machine to form an elastomeric adhesive or sealant having useful physical and chemical properties. Yet another object of this invention is to provide an elastomeric composition in tape form such that any portion thereof contains the proper proportions of curing constituents for the elastomer.

DETAILED DESCRIPTION OF THE INVENTION

According to this invention, the above-described objects and advantages are obtained by preparing an elastomeric tape comprising a first band of uncured elastomer, and a second band, the bands being joined together in close side-by-side relation throughout their entire lengths, said second band comprising an agent dispersed in a suitable carrier, which agent causes curing of said elastomer in said first band when said first and second bands are combined to form a substantially uniform mixture.

In the appended drawings, FIGS. 1 through 5 are plan views illustrating various embodiments of elastomeric tapes according to this invention. The various embodiments illustrated by the drawings are discussed in further detail hereinafter.

The elastomeric tape of this invention has two principal components, viz, an uncured elastomer and a curing system for the elastomer. The uncured elastomer may comprise natural or synthetic rubber. Synthetic elastomers include various homopolymers, copolymers, and polycondensation polymers known in the art. Typical of the homopolymer elastomers is polychloroprene (neoprene) obtained by the emulsion polymerization of chloroprene (2-chloro-1,3-butadiene). Copolymer elastomers include butyl rubber obtained by the ionic polymerization of isobutylene with small amounts of isoprene. Polycondensation elastomers, such as polysulfide rubber, obtained by the condensation of alkali (sodium) polysulfides with aliphatic dihalogen compounds may also be utilized as the uncured elastomers in preparing the elastomeric tape of this invention. Accordingly, as used herein and in the appended claims, the term "elastomer" is meant to include not only those elastomers referred to specifically above, but also those other elastomers and substances such as highly flexible plastics which have the properties of natural or synthetic rubber.

The curing system for the uncured elastomer of the elastomeric tape will generally comprise two basic components, namely, a curing agent for the elastomer and an activator or accelerator which speeds up or enhances the action of the curing agent. As will be discussed in more detail hereinafter, specific curing agents and activators or accelerators utilized in a given elastomeric tape composition depend primarily upon the specific elastomer utilized in forming the tape and to a lesser extent, upon the rate and degree of curing desired for the elastomeric product.

In addition to the uncured elastomer and curing system components, the elastomeric tape may contain a variety of conventional and special purpose ingredients. Thus, the uncured elastomer and curing system components may be combined with various plasticizers and fillers to provide compositions having the physical properties required for forming a tape. In addition, various pigments, and the like, may be included.

The plasticizers, fillers and other components must be selected and combined in such a manner as to provide compositions which can be formed into the desired tape by extrusion. To accomplish this, the material making up each band of the tape is formulated into a "putty-like" composition, and the respective compositions are simultaneously extruded in side-by-side relationship to produce a length of tape. Moreover, the bands should be so formulated that little, if any, migration or interaction occurs between the curing system components in one band of the tape and the elastomer in another band. That is, the elastomeric tape is formed so that the elastomer and curing system components therefor are contained in separate bands making up the tape in such manner that the elastomer itself will not cure until substantially equal lengths of the respective bands are combined into a substantially uniform mixture, after which curing proceeds as in conventional elastomeric compositions.

In one embodiment of the invention, the elastomeric tape may comprise two bands each containing elastomer together with one component of a two component curing system. Thus, one band of such a tape may contain a portion of the elastomer together with a curing agent for the elastomer, while the other band contains a portion of the elastomer together with an activator or accelerator for the curing agent. In such a case, the curing agent selected will be one which has no substantial curing activity in the absence of the activator. Likewise, the activator or accelerator in such system should have substantially no curing action on the elastomer with which it is associated.

The elastomeric tapes of the invention may also be formulated in such a manner that the elastomer and the curing system components are contained in separate adjoining bands.

Considering the invention in greater detail in connection with the drawings, it is noted, as pointed out above, that the elastomeric tape may be prepared in various forms, the particular form of an elastomeric tape depending primarily upon the specific elastomer utilized in the tape.

FIG. 1 illustrates an elastomeric tape in which each of the two bands (1 and 2) forming the tape contains a portion of the elastomer together with one component of a two component curing system. This tape form is particularly desirable when preparing tapes from copolymer elastomers such as butyl rubber.

Butyl rubber elastomers desirable for use in the present invention are semi-liquid elastomers having a low-molecular weight ranging from about 3000 to about 50,000. To prepare the elastomeric tape illustrated in FIG. 1 utilizing low molecular weight butyl rubber as the elastomer, two separate putty-like masses are formed, each containing butyl rubber and one of the curing system components. Each putty-like mass is then extruded through a coextrusion die to form the desired tape. As mentioned above, the particular curing system utilized in preparing the elastomeric tape depends, in the main, on the particular elastomer utilized in the tape.

The most desirable curing system for elastomeric tapes containing butyl rubber as the elastomer comprises an aromatic nitrogen-containing compound, such as para-quinone dioxime, and an oxidizing agent, such as a metal oxide, manganese dioxide and lead dioxide in particular, as the activator. Butyl rubber curing systems comprising p-quinone dioxime and lead dioxide are well known in the art and the mechanism through which curing of the butyl rubber is accomplished is generally believed to involve oxidation of the p-quinone dioxime by the metal oxide, forming in situ, the active crosslinking agent, p-dinitrosobenzene.

The amount of each component of the curing system contained in each band of the butyl rubber base depends upon (a) the amount of unsaturation in the butyl rubber elastomer, and (b) the degree of crosslinking desired, that is, the physical properties desired in the ultimate cured butyl rubber adhesive or sealant.

To accomplish satisfactory curing, there should be a sufficient amount of each component of the curing system to cross-link at least about 45 to about 90%, preferably about 65% of the available cross-linking sites in the butyl rubber in the tape. Curing to this extent can be achieved by use of from about 2 to about 5, preferably about 3 parts of p-quinone dioxime, and from about 5 to about 20, preferably about 7.5 parts of lead dioxide, per 100 parts of butyl rubber in the tape.

The metal oxide activator component of the curing system may also have an accelerator associated with it. Useful accelerators which reduce curing time include water, acetic acid, dimethyl formamide, cobalt naphthenate or a mixture of equal parts of acetic acid and dimethyl formamide. Relatively minor amounts of the accelerator, e.g., 1 part per 100 parts by weight of butyl rubber, or somewhat less, may be incorporated into the band containing the activator component of the curing system.

In combining the curing system components with the butyl rubber, care must be taken to insure that the components are intimately mixed or dispersed within the butyl rubber. This can be accomplished in a mechanical mixer or mulling device using finely divided p-quinone dioxime and lead dioxide.

After the respective curing system components are uniformly mixed with separate portions of butyl rubber and the mixtures are formed into separate tape bands, subsequent combining of any portion of the tape bands into a substantially uniform mixture produces a self-curing system.

In addition to butyl rubber base and curing system components, the bands of the tape illustrated in FIG. 1 may contain plasticizers, fillers and pigments.

Plasticizers are utilized to provide the cured elastomer with the desired degree of softness and resiliency and to give the composition of which the bands are formed the physical properties necessary for efficient extrusion. Plasticizers compatible with butyl rubber are well known and include hydrocarbon oils, various waxes, metal salts of fatty acids, higher aliphatic esters, aromatic esters, and resins derived from alkylated phenols, terpenes, and ester gums. The amount of plasticizer utilized in the material to ve extruded into tape form is not critical and varies depending upon the molecular weight or grade of the butyl rubber as well as with the physical properties desired for the cured elastomer. In general, the plasticizer in each band may comprise as much as about 40 parts by weight, based on the weight of elastomer. The plasticizer content of each band should, in general, be about the same so that each band will have essentially the same physical properties both during extrusion and in use. While a single plasticizer can be utilized, a mixture of one or more plasticizers may also be used or the same or different plasticizers may be incorporated into the elastomeric compositions comprising the respective tape bands.

Various fillers also may be incorporated in the compositions with which the bands are formed. Useful fillers include various clays, talc, carbon black, silica, and calcium carbonate. Fillers provide the elastomeric compositions with the physical properties necessary for extrusion into tape form and also enhance the properties of the cured system. Since the low molecular weight elastomers, such as butyl rubber, are often liquid, fillers are incorporated into the composition in amounts sufficient to produce a "putty-like" mass which can be easily extruded into the desired elastomeric tape.

Pigments may be included in the elastomeric composition as desired. Useful pigments include titanium dioxide and zinc sulfide which provide a white color; carbon black for black color and various organic and inorganic pigments for other colors. It is desirable that the respective bands of the elastomeric tape be of contrasting color to facilitate use of the elastomeric tape.

In use, a portion of the tape comprising substantially equal lengths of each band of the tape is selected, and the bands are mixed together, e.g., by hand. The mixing permits the components of the curing system to react to effect curing in situ. When the bands of the tape are of contrasting color, it is easy to determine when a uniform mixture has been obtained simply by continuing mixing until the mixture has a uniform color. It will be appreciated that pigment may be included in one or both bands of the elastomeric tape.

FIG. 2 illustrates an elastomeric tape in which the composition of the respective bands may be that of FIG. 1, however, the bands of tape are superimposed in their greater dimension one upon the other throughout their length.

FIG. 3 illustrates an elastomeric tape in which band 1 of the tape contains a portion of the elastomer together with one component of a two component curing system, while band 2 of the tape contains another portion of the elastomer together with the second component of the curing system. Between bands 1 and 2 is band 3, a neutral band, which does not contain either component of the curing system and may be either a band of the elastomer itself or the various plasticizers which may be useful in forming the butyl rubber tape, the three bands being in side-by-side relationship throughout their lengths with band 3 acting as a physical barrier between bands 1 and 2. This form of tape is particularly desirable when using copolymer elastomers, such as butyl rubber.

Formulating butyl rubber based elastomeric tape compositions in the form illustrated in FIG. 3 is especially useful when certain organic oxidizing agents are utilized as the activator component of the curing system. For example, t-butyl perbenzoate and benzoyl peroxide are effective activators, reacting in situ when mixed with p-quinone dioxime to form p-dinitrosobenzene, the curing agent for butyl rubber. However, it has been found such activators cannot be utilized in tape formulations such as illustrated in FIGS. 1 and 2 since they tend to migrate from the band in which they are incorporated into the band containing the curing agent. Such migration results in premature curing of the elastomer, which is undesirable. Migration of the activating agent and premature curing can be avoided by providing a band of the butyl rubber or plasticizer between the bands containing butyl rubber plus one component of the two component curing system. The intermediate band should contain butyl rubber or plasticizer with a sufficient amount of filler, pigment and the like to provide the required physical properties for extrusion. The intermediate band generally contains an amount of butyl rubber equivalent to that contained in the other two bands, although it can contain somewhat less butyl rubber and still prevent premature curing of the elastomer.

Only small quantities of the above-mentioned oxidizing agents are required to obtain the desired degree of curing. Thus, from about 1 to about 10 parts, preferably about 3 parts, by weight of t-butyl perbenzoate, per 100 parts butyl rubber in the tape may be used to accomplish the desired level of curing. The activating agents are incorporated into the butyl rubber simply by mixing them with the rubber and any plasticizers, fillers and pigments present.

One factor which makes the use of activating agents such as t-butyl perbenzoate and other organic peroxides desirable, despite the necessity of the intermediate band 3 of butyl rubber, is the fact that on mixing and curing, the resultant elastomer will be much lighter in color than will an elastomer prepared with the metal oxide activating agents. Thus, by using the former activating agents, it is possible to obtain a cured elastomer which is off-white to gray in color. On the other hand, metal oxide activating agents provide cured elastomers with a dark gray to black color.

The butyl rubber tapes illustrated in FIGS. 1 and 2 may be prepared in the following manner. The composition making up each band of the tape is prepared separately by mixing together of the constituents, and the separate mixtures are extruded through a co-extrusion die. In preparing the elastomer composition for extrusion, the dry ingredients are combined with the liquid butyl rubber to form a highly viscous, smooth, putty-like mass. The separate compositions are then formed into cylindrical slugs which can be introduced to a suitable extruder. The compositions forming the respective bands are extruded from twin extruders arranged at right angles to one another, and the extrudates are then co-extruded through a die which simultaneously lays down the respective bands in side-by-side relationship to form a tape. The tape is generally extruded onto a moving strip of silicone coated release paper. The release paper moves at a constant rate on an endless belt, and is controlled so that the extruded tape is not pulled or allowed to buckle. The bands of material being extruded through the co-extrusion die may have different rheological properties at any given temperature, which causes the materials to pass through the die at different rates. To alleviate the problem and insure that the bands are extruded at substantially the same rate, the die for the material which extrudes more slowly should be maintained at a higher temperature than that of the other die. During the extrusion process, the temperature of the composition should not exceed about 150° F., otherwise premature curing of the butyl rubber at the interface between the bands may result.

To prepare the tape illustrated in FIG. 3, the constituents of each band are prepared as described above; however, there are, of course, separate putty-like compositions for the extrusion process. The compositions forming the three bands are extruded from three extruders leading to a single tri-extrusion die which simultaneously lays down the three bands in side-by-side relationship to form the tape of FIG. 3.

After extrusion, any desired length of the tape may be simply rolled up and packaged in any desired manner. There is no need for special packaging requirements to give a useful shelf life to the tape.

It is known that butyl rubber cures to form a hard film with minimal adhesion to most smooth substrates, such as glass and aluminum. It is also known that adhesion of butyl rubber to these and various other substrates may be increased by incorporating various silane compounds in the butyl rubber prior to curing. Thus, the tapes of this invention may contain such silane compounds to obtain the improved adhesion. The silane compound is preferably incorporated into a single band of the tape and it is preferred that the silane compound be incorporated into the band containing the curing agent component of the curing system. For example, the use of about 3 to about 9 parts of gamma-methacryl-oxypropyltrimethoxysilane per 100 parts of butyl rubber in the tape enhances the adhesion of the cured elastomer to glass substrates, while including from about 5 to about 10 parts of gamma-glycid-oxypropyltrimethoxysilane in the elastomer composition significantly increases the adhesion of the cured elastomer to aluminum substrates.

FIG. 4 illustrates an elastomeric tape in which one band (4) of the tape contains the elastomer while another band (5) contains the curing system for the elastomer. This tape form is particularly desirable when preparing tapes from elastomeric homopolymers, such as polychlorobutadiene and elastomeric polycondensation polymers such as polysulfide rubber.

Polysulfide elastomers suitable for use in preparing the elastomeric tapes of this invention include both liquid and solid polysulfide elastomers with a mixture of the two being especially useful. The polysulfide elastomer or mixture of such elastomers is selected so that when combined and mixed with suitable fillers, plasticizers, and pigments, a putty-like composition is obtained which can be extruded into tape form. Solid polysulfide elastomers having a molecular weight ranging from 40,000 to 100,000 and liquid polysulfide elastomers having a molecular weight ranging from 3000 to 8000 can be combined in a ratio of about two parts of the former per part of the latter. The two types of elastomers should be combined so as to produce a smooth, paste-like, lump-free mass. To prepare the elastomeric tape illustrated in FIG. 4 utilizing a mixture of solid and liquid polysulfide elastomers, the elastomers are first combined with suitable plasticizers, fillers, softeners and pigments to form a putty-like mass. Another putty-like composition is formed comprising the curing system components in a suitable carrier comprising plasticizers, fillers, etc. Separate bands, one of each composition, are extruded through a co-extrusion die to form the tape illustrated in FIG. 4.

Suitable plasticizers for use with polysulfide rubber elastomers include polychlorinated biphenyls and various ester type plasticizers. The amount of plasticizer utilized with the polysulfide rubber elastomer base can vary considerably depending upon the physical properties desired for the final cured elastomer. A single plasticizer or a mixture of plasticizers may be utilized. The various fillers and pigments referred to above in connection with the tapes of FIGS. 1 to 3 can also be incorporated into the elastomeric composition prior to extrusion.

The curing system for the polysulfide elastomer is contained in a band (5) of the elastomeric tape illustrated in FIG. 4. The curing system and polysulfide elastomer are present in separate bands of the elastomer tape to prevent premature curing of the polysulfide elastomer prior to actual use of the material.

As in the case of the butyl elastomer, the polysulfide elastomer itself dictates the curing system to be utilized. Thus, the curing system selected is one which when mixed with the polysulfide elastomer causes curing through reaction with the —SH— groups therein, preferably under ambient conditions, to form a tough, hard elastomer. Suitable curing agents for the polysulfide elastomers include lead dioxide, manganese dioxide, zinc peroxide, and calcium peroxide.

The amount of curing agent contained in the curing system band of the polysulfide rubber elastomeric tape depends upon (a) the number of reactive —SH— groups in the polysulfide elastomer, and (b) the degree of curing desired, that is, the physical properties desired in the ultimate cured polysulfide elastomer. To accomplish satisfactory curing, the curing system band should be formulated with a sufficiently high level of curing agent to react with the available —SH— groups. Curing is accomplished by incorporating from about 7 to about 50 parts, preferably about 30 parts by weight, of the curing agent based on the weight of the polysulfide elastomer in the tape.

The curing system for the polysulfide rubber elastomer tape comprises the curing agent plus a carrier. Suitable carriers for the curing agent include low melting waxes or resins such as chlorinated polyphenyls and chlorinated biphenyl, preferably mixtures of these compounds, the combination of curing agent and carrier forming a putty-like mixture which can be extruded with the polysulfide rubber elastomer through a co-extrusion die forming the tape illustrated in FIG. 4. The curing system is formulated by combining the curing agent in small increments with the carrier until a smooth, putty-like mixture is obtained. This mixture is then ready for extrusion with the polysulfide rubber elastomer mixture.

As in the case of the butyl rubber tape, the polysulfide elastomer tapes are prepared by forming separate compositions of the components making up each band of the tape, and extruding the composition through a co-extrusion die.

In the case of the extruded polysulfide elastomer tape, while the band containing the curing agent is in side-by-side relationship to that comprising the elastomer, no curing occurs at the interface between the bands since the curing agent does not migrate into the band of polysulfide elastomer.

To utilize the polysulfide elastomer tape as an adhesive or sealant, a length of the tape formed of the respective bands is removed from a roll, and the bands are mixed together to form a uniform mixture. Since the tape is formulated so that the respective bands preferably have contrasting color, mixing of the bands until a uniform color is achieved serves as a guide for determining the sufficiency of the mixing. On mixing the elastomer cures, forming a tough hard seal resistant to oil, aliphatic solvents and water.

Homopolymer elastomers such as polychloroprene (neoprene) are also suitable for preparing elastomeric tapes of the type illustrated in FIG. 4. In such tapes, one band contains the elastomeric component of the tape together with one component of a two component curing system, while the other hand contains the second components of the curing system in a suitable carrier. However, in this embodiment, the carrier should not be in the elastomer.

Polychloroprene elastomers suitable for preparing such tapes have an average molecular weight of about 4500 and a Brookfield viscosity of about 100,000 cps. at room temperature. These elastomers are liquid in form and they are mixed a curing system component, suitable fillers and pigments to form a putty-like composition which can be extruded into tape form. In practice, the curing agent component of the curing system is combined with the elastomer, while the activating agent for the curing system is contained in the other band. To prepare an elastomeric tape such as illustrated in FIG. 4 the material comprising each band is formulated into a putty-like mass and extruded through a co-extrusion die.

Suitable curing agents for polychloroprene include lead dioxide and zinc oxide or mixtures of these compounds. Magnesium oxide can be added as an acid scavenger.

Suitable fillers include carbon black, silica, calcium carbonate, and talc. When carbon black is selected as the filler it serves also as a pigmenting agent imparting its characteristic black color to the elastomeric band. The amount of filler utilized with a particular polychloroprene elastomer varies with the molecular weight of the elastomer and is determined empirically in that a sufficient amount is utilized to obtain a putty-like mass which can be extruded into the desired tape form.

The other component of the curing system, the activator for the curing agent, is also combined with fillers and a carrier to form a putty-like mass capable of being extruded through a co-extrusion die with the elastomer. The activating agent for the curing agent may be an amine activator such as piperazine. Curing is accomplished by incorporating from about 2 to about 12 parts, preferably about 6 parts, by weight, of the curing agent based on the weight of the polychloroprene elastomer in the tape.

Suitable carriers for use in the activating agent band of the tape include chlorinated paraffins and chlorinated biphenyls. Fillers suitable for the activating agent band of the tape include talc, silica, and clay.

The required putty-like mass is formed by combining the carrier, curing agent activator, and fillers to produce a smooth, uniform, putty-like material. In general, approximately equal amounts by weight of carrier and pigment are included in the activating agent band of the tape.

The amount of the curing system contained in the respective bands of the polychloroprene elastomeric tape depends upon the number of curing sites available in the polychloroprene and on the degree of curing desired, that is, on the physical properties desired in the ultimate cured polychloroprene rubber adhesive or sealant. To accomplish satisfactory curing, the curing system should be formulated with a sufficient level of the curing agents to react with the available curing sites in the polychloroprene rubber. Curing to this extent can be accomplished by employing from about 6 to about 15 parts, preferably about 10 parts, by weight, of the curing agent component per 100 parts of the elastomer in the tape.

Polychloroprene elastomer tapes are prepared in the same manner as the butyl rubber and polysulfide rubber elastomer tapes described above, and these tapes are utilized in the manner described for those other elastomer tapes.

The term carrier as used herein encompasses both the elastomer utilized in a given tape as well as various other materials described hereinabove which provide the desired properties to a given band of an elastomeric tape.

FIG. 5 illustrates another form in which the tapes of this invention may be constructed. In this embodiment, for example, band 6 contains an elastomer plus curing agent while band 7 contains elastomer plus activating agent much in the same manner as described above for the tape illustrated in FIG. 1. It is desirable to prepare tapes in this form when one of the materials making up a band of the tape does not have sufficient cohesiveness to be self-supporting.

The following examples are set forth as illustrative of the present invention:

EXAMPLE 1

Fifty grams of butyl rubber having a molecular weight of 32,000 is added to a water-cooled, double arm Patterson Kneader Mixer. Thirty-five grams of titanium dioxide, pigment grade, together with 10 grams of Arizona® 208, an isooctyl ester of tall oil fatty acid of the Arizona Chemical Corp., 12 grams of p-quinone dioxime, 50 grams of talc and 25 grams of clay are slowly added to the mixer with constant agitation forming a highly viscous, smooth material. An additional 50 grams of butyl rubber, 50 grams of talc and 25 grams of clay are incrementally added until a smooth, light-colored, putty-like mixture is obtained. During this mixing procedure, the mixer should be cooled so that the temperature of the mass does not exceed 175° F.

A second mixture is prepared by mixing 100 grams of butyl rubber having a molecular weight of 32,000, with 90 grams of manganese dioxide, 20 grams of talc, 10 grams of clay and 10 grams of water. This mixture is prepared by slowly adding the solid material to the liquids in a water-cooled, double-arm Patterson Kneader Mixer cooled so that the temperature of the mixture does not exceed 175° F. and mixed until a dark-colored, smooth, putty-like mass is obtained.

Equal portions, by weight, of each mixture are formed into slugs and fed separately into twin extruders arranged at right angles to one another, the extruders feeding each mass into a co-extrusion die which simultaneously lays down a band of each mixture in side-by-side relationship onto a moving strip of silicone coated release paper. The release paper moves over an endless belt at a constant rate so that the extruded bands are not pulled or allowed to buckle. The bands of material being extruded through the co-extrusion die may have different rheological properties at any given temperature, causing them to pass through the die at different rates. To insure that the bands are extruded at substantially the same rate, the die for the material which extrudes more slowly should be maintained at a higher temperature than that of the other die, however, in no event should the temperature of either mixture exceed 150° F.

As the bands of each material are laid down in side-by-side relationship, a tape is formed which is rolled into any convenient lengths and packaged as any conventional tape.

To utilize the tape, any length thereof is removed from the roll, separated from the release paper and kneaded by hand or machine until a uniformly colored mixture is obtained. The mixture is applied and allowed to stand while curing occurs forming a tough, hard butyl rubber seal.

EXAMPLE 2

Following the procedure and utilizing the apparatus described in Example 1, three separate mixtures are prepared as follows: 100 grams of butyl rubber having a molecular weight of 32,000 is mixed with 6 grams of t-butyl perbenzoate, 40 grams of titanium dioxide, 100 grams of talc (Mistron Vapor® of the United Sierra Division of Cyprus Mines, Inc.) and 50 grams of Whitetex® clay (Freeport Kaolin Company) forming the first mixture. A second mixture is prepared by combining 100 grams of butyl rubber having a molecular weight of 32,000, 150 grams of Mistron Vapor® talc, 50 grams of Whitetex® clay and 20 grams of Arizona® 208. The third mixture is prepared by combining 100 grams of 32,000 molecular weight butyl rubber with 12 grams of p-quinone dioxime, 35 grams of titanium dioxide, 100 grams of Mistron Vapor® talc, 50 grams of Whitetex® clay, 7 grams of 12% cobalt naphthanate and 20 grams of Arizona® 208.

These three mixtures are extruded through a tri-extrusion die so that the three bands of material are laid down in side-by-side relation with the second mixture constituting a band intermediate between the respective bands of the first and second mixtures. As the bands of each material are laid down in side-by-side relationship, a tape is formed which is rolled into any convenient lengths and packaged as any conventional tapes.

To utilize the tape, any length thereof is removed from the roll, separated from the release paper and kneaded by hand or machine until a uniformly colored mixture is obtained. The mixture is applied and allowed to stand while curing occurs, forming a tough, hard butyl rubber seal.

EXAMPLE 3

Following the procedure and utilizing the apparatus described in Example 1, two separate mixtures are prepared as follows: 100 grams of solid polysulfide rubber having terminal mercaptan moieties and a molecular weight of 80,000 is added to the kneader mixer followed by the incremental addition of 25 grams of liquid polysulfide rubber having a molecular weight of 4000, 20 grams of titanium dioxide, 15 grams of calcium carbonate, and 50 grams of talc. This mixture is slowly agitated until a smooth lump-free mass is obtained, the temperature of the mixture building up to 175° F. Following this, 0.085 gram of mercaptobenzothiazole and 0.04 gram diphenylguanidine are added and mixed forming a putty-like material. The balance of the material in this mixture, 25 grams of liquid polysulfide rubber, 9 grams of Thiokol® TP–90B (an ester type plasticizer), 15 grams of calcium carbonate, and 25 grams of talc are then added to the mixture and uniformly mixed therewith forming a dark, smooth, putty-like mixture.

A second mixture is prepared by combining 15 grams of Aroclor® 6070 and one gram of Aroclor® 1262 (chlorinated polyphenyl and chlorinated biphenyl, respectively, of Monsanto Chemical Company) and melting these plasticizers at a temperature of about 130° F. in a Kneader mixer. Thirty grams of lead dioxide is incrementally added to the molten plasticizer controlling the temperature of the mass so that it does not exceed 150° F. Mixing continues until a smooth, putty-like mass is obtained.

Equal parts, by weight, of each mixture are separately fed in the form of slugs into twin extruders arranged at right angles to one another, the extruders feeding each mass into a co-extrusion die which simultaneously lays down a band of each mixture in side-by-side relationship onto a moving strip of silicone coated release paper. The release paper moves over an endless belt so that the extruded bands are not pulled or allowed to buckle. As the bands of each material are laid down in side-by-side relationship, a tape is formed which is rolled into any convenient lengths and packaged as any conventional tape. To utilize the tape, any length thereof is removed from the roll, separated from the release paper and kneaded by hand until a uniformly colored mixture is obtained. This mixture is applied and allowed to stand while curing occurs, forming a tough, hard polysulfide rubber seal.

EXAMPLE 4

An elastomeric tape is prepared by forming two separate mixtures in a water-cooled double arm Patterson Kneader Mixer. One mixture contains the elastomer content of the tape and is prepared by adding 100 grams of fluid polychloroprene having an average molecular weight of 4500 to the kneader mixer followed by the incremental addition of 10 grams of lead dioxide, 4 grams of zinc oxide, 4 grams of magnesium oxide and 110 grams of carbon black. Mixing continues until a smooth, black putty-like material is obtained. The temperature of the mixture is maintained below about 150° F.

A second mixture containing the activating component of the curing system is formed by mixing 100 grams of Chlorowax® 50 (chlorinated paraffin plasticizer manufactured by Diamond Shamrock Company), 6 grams of piperazine and 100 grams of talc having a particle size of about one micron, in a double arm Kneader mixer.

Equal portions by weight of each mixture are fed in the form of slugs into twin extruders arranged at right angles to one another, the extruders feeding each mass into a co-extrusion die which simultaneously lays down a band of each mixture in side-by-side relationship onto a moving strip of silicone coated release paper. The release paper moves over an endless belt at a constant rate, so that the extruded bands are not pulled or allowed to buckle. As the bands of each material are laid down in side-by-side relationship, a tape is formed which is rolled into any convenient lengths and packaged as any conventional tape.

To utilize the tape, any length thereof is removed from the roll, separated from the release paper and kneaded by hand until a uniformly colored mixture is obtained. The mixture is applied and allowed to stand while curing occurs forming a tough, hard polychloroprene rubber seal.

Having thus defined this invention:
What is claimed is:

1. An elastomeric tape comprising a first band of uncured elastomer, and a second band, said bands being joined together in close side-by-side relation throughout their entire lengths, said second band comprising an agent dispersed in a carrier, said agent causing curing of said elastomer in said tape when said first and second bands are combined to form a substantially uniform mixture.

2. An elastomeric tape according to claim 1 wherein said agent for curing said uncured elastomer is one component of a two component curing system, the other component of said curing system being present in said first band and wherein said carrier of said second band comprises uncured elastomer of the type present in said first band.

3. An elastomeric tape according to claim 2 wherein said uncured elastomer is comprised of butyl rubber having a molecular weight ranging from 3000 to about 50,000, and wherein said two component curing system is comprised of a curing agent for said uncured elastomer, and an activating agent for said curing agent, said curing agent component being present in said first band of said tape, and said activating agent being present in second band of said tape.

4. An elastomeric tape according to claim 3 wherein said curing agent is comprised of from about 2 to about 5 parts of p-quinone dioxime per 100 parts of butyl rubber in the tape and said activating agent is comprised of from about 5 to about 20 parts of a metal oxide selected from the group consisting of manganese dioxide and lead dioxide per 100 parts of butyl rubber in the tape.

5. An elastomeric tape according to claim 4 wherein said curing agent comprises about 3 parts of p-quinone dioxime per 100 parts of butyl rubber in the tape and said activating agent comprises about 7.5 parts of lead dioxide per 100 parts of butyl rubber in the tape.

6. An elastomeric tape according to claim 4 wherein said activating agent has an accelerator for said curing system which comprises about 1 part per 100 parts of butyl rubber in the tape, of an agent selected from the group consisting of water, acetic acid, dimethyl formamide, cobalt naphthenate or a mixture of equal parts of acetic acid and dimethyl formamide.

7. An elastomeric tape according to claim 3 wherein said first band of said tape also includes from about 3 to about 9 parts of gamma-methacryloxypropyltrimethoxysilane per 100 parts of butyl rubber in the tape.

8. An elastomeric tape according to claim 3 wherein said first band of said tape also includes from about 5 to about 10 parts of gamma-glycidoxypropyltrimethoxysilane per 100 parts of butyl rubber in the tape.

9. An elastomeric tape according to claim 3 having a third band of neutral material disposed between said first and second bands of said tape and coextensive therewith.

10. An elastomeric tape according to claim 9 wherein said neutral band is butyl rubber.

11. An elastomeric tape according to claim 9 wherein said curing agent for said elastomer is contained in said first band and is comprised of from about 2 to about 5 parts of p-quinone dioxime per 100 parts of butyl rubber in the tape and said activating agent for said curing agent is contained in said second band and is comprised of from about 1 to about 10 parts of t-butyl perbenzoate per 100 parts of butyl rubber in the tape.

12. An elastomeric tape according to claim 1 wherein the uncured elastomer of said first band is comprised of a mixture of solid polysulfide elastomers having a molecular weight ranging from 40,000 to about 100,000 and liquid polysulfide elastomers having a molecular weight ranging from 3000 to 8000 in a ratio of two parts of the former per part of the latter and wherein the curing agent of said second band is comprised of from about 7 to about 50 parts, by weight, based on the weight of polysulfide elastomer in the tape of a member selected from the group consisting of lead dioxide, manganese dioxide, zinc peroxide and calcium peroxide in a carrier for said curing agent, said carrier comprising a member seelcted from the group consisting of chlorinated polyphenyl or chlorinated biphenyl or mixtures of these compounds.

13. An elastomeric tape according to claim 1 wherein said uncured elastomer of said first band is comprised of polychloroprene elastomers having an average molecular weight of about 4500 and wherein said agent for curing said uncured elastomer is one component of a two component curing system, the other component of said curing system being present in said first band.

14. An elastomeric tape according to claim 12 wherein said two component curing system is comprised of a curing agent for said uncured elastomer, said curing agent component being present in said first band and an activating agent for said curing agent, said activating agent being present in said second band in a non-elastomer carrier.

15. An elastomeric tape according to claim 13 wherein said curing agent is comprised of from about 6 to about 15 parts of a member selected from the group consisting of lead dioxide, zinc oxide, and mixtures of these oxides in any proportion, per 100 parts of elastomer in the tape and said activating agent is comprised of from about 2 to about 12 parts of piperazine per 100 parts of elastomer in the tape.

References Cited
UNITED STATES PATENTS 3,009,846   11/1961   Gruber _____ 161—240 X WILLIAM A. POWELL, Primary Examiner U.S. Cl. X.R.

156—244, 247; 161—202, 217, 221, 239, 253, 255, 406